US005914890A

United States Patent [19]

Sarangapani et al.

[11] Patent Number: 5,914,890

[45] Date of Patent: Jun. 22, 1999

[54] METHOD FOR DETERMINING THE CONDITION OF ENGINE OIL BASED ON SOOT MODELING

[75] Inventors: Jagannathan Sarangapani, Peoria; David R. Schricker, Dunlap; Trent A. Simpson, Peoria, all of Ill.

[73] Assignee: Caterpillar Inc., Peoria, Ill.

[21] Appl. No.: 08/961,445

[22] Filed: Oct. 30, 1997

[51] Int. Cl.[6] .......... G01D 21/00

[52] U.S. Cl. .......... 364/550; 73/117.3

[58] Field of Search .......... 356/70; 364/424, 364/550, 551, 552, 431.01, 431.03; 340/52 R, 52 F, 59; 73/10, 64, 117.3, 117.2, 116; 123/196 S, 198 D; 184/1.5, 6.5, 6.6, 6.7, 6.8

[56] References Cited

U.S. PATENT DOCUMENTS

| | | | |
|---|---|---|---|
| 4,311,041 | 1/1982 | Reid et al. | 73/117.3 |
| 4,495,417 | 1/1985 | Hohensang | 250/343 |
| 4,497,200 | 2/1985 | Tournier | 73/64 |
| 4,506,337 | 3/1985 | Yashuhara | 364/550 |
| 4,533,900 | 8/1985 | Muhlberger et al. | 340/52 |
| 4,677,847 | 7/1987 | Sawatari et al. | 73/64 |
| 4,742,476 | 5/1988 | Schwartz et al. | 364/550 |
| 4,796,204 | 1/1989 | Inoue | 364/550 |
| 4,839,831 | 6/1989 | Imajo et al. | 364/550 |
| 4,847,768 | 7/1989 | Schwartz et al. | 364/424 |
| 5,309,213 | 5/1994 | Desjardins et al. | 356/70 |
| 5,548,393 | 8/1996 | Nozawa et al. | 356/70 |
| 5,585,553 | 12/1996 | Schricker | 73/117.3 |
| 5,646,341 | 7/1997 | Schricker et al. | 73/117.3 |

FOREIGN PATENT DOCUMENTS 4401835 8/1994 Germany .

OTHER PUBLICATIONS

File 95–401 S/N 08/749,603; Filed: Nov. 18, 1996; David R. Schricker.

SAE Technical Paper Series 1987; 870403; Development of an Automatic Engine Oil–Change Indicator System.

*Primary Examiner*—Frank G. Font
*Assistant Examiner*—Michael P. Stafira
*Attorney, Agent, or Firm*—Steve D. Lundquist

[57] ABSTRACT

A method for monitoring the condition of oil in an engine is disclosed which includes the steps of determining a plurality of parameters, determining a fuel injection model, determining the area of the cylinder walls that is coated with soot, and responsively determining a soot model. The method may include the additional steps of calculating a value of residual soot, and calculating a value of soot dispersed by dispersants. The accumulation of soot determined from the model may be trended over time to predict the useful life of the oil.

30 Claims, 4 Drawing Sheets

METHOD FOR DETERMINING THE CONDITION OF ENGINE OIL BASED ON SOOT MODELING

TECHNICAL FIELD

This invention relates generally to a method for determining the condition of engine oil and, more particularly, to a method for modeling soot that is present in engine oil and responsively determining the condition of the oil.

BACKGROUND ART

Engines are required to operate under increasingly demanding conditions. The loads applied to the engine, and the harshness of the surrounding environment, place a great amount of stress on an engine. Therefore, consistent monitoring of the condition of the oil is increasingly important.

Currently, the condition of engine oil, i.e., when the useful life of the oil has ended, is estimated by monitoring the length of time the oil is in use, and modifying the estimate by accounting for the conditions under which the engine operates. The estimate is used to determine the interval, in time or mileage, between oil changes. However, the condition of the oil at any given time cannot be determined by this method.

In addition, the estimate may not accurately determine the useful life of the oil. Therefore, the oil may be changed too frequently, which adds unnecessary maintenance costs, or not frequently enough, which causes undue wear on the engine.

Attempts have been made to monitor the condition of engine oil in real time by monitoring one or more parameters of the oil that lead to oil deterioration. For example, during combustion of fuel in an engine, some of the fuel only partially combusts. The by-product of this partial combustion is known as soot. Soot is deposited during each combustion cycle on the walls of each cylinder in an engine due to the relatively lower temperatures on the walls; thereby preventing full combustion from occurring. The rings on the pistons then wipe this soot off the cylinder walls and deposits the soot into the oil that lies in the crankcase of the engine.

The accumulation of soot in the oil is a direct indicator of oil condition. Therefore, research has resulted in methods and systems to monitor the amount of soot in oil, which can be used to determine the condition of the oil.

For example, in U.S. Pat. No. 5,548,393, Nozawa et al disclose an apparatus for detecting the amount of soot in oil. The apparatus includes a light-emitting device that emits a light which is reflected by a chamber containing the oil. The amount of light reflected is used to indicate the amount of soot in the oil. As the concentration of soot increases, the amount of reflected light decreases.

However, the relationship of reflected light to soot concentration is not linear. For small amounts of soot, the change in reflected light to a change in soot concentration can be easily measured. As the amount of soot increases, the rate of change in the light that is reflected diminishes. Therefore, the change in reflected light for a change in heavily concentrated soot becomes much more difficult to measure. As a result, determining the amount of soot in oil as the oil nears the end of its useful life cannot be done accurately.

Other techniques for measuring the amount of soot in oil are not practical for use in real time. In one example, a method to measure soot results in heating a sample of oil under controlled conditions until the oil evaporates. The remaining residue, soot, can then be measured. This method would not be practical to determine the amount of soot while the engine is operating.

The present invention is directed to overcoming one or more of the problems as set forth above.

DISCLOSURE OF THE INVENTION

In one aspect of the present invention a method for determining the condition of oil in an engine is disclosed. The method includes the steps of determining a plurality of parameters, determining a model of the duration of injection of fuel into a cylinder, determining a wall area of the cylinder that is coated with soot, and determining a model of the soot in the oil as a function of the parameters and the coated wall area.

In another aspect of the present invention a method for determining the condition of oil in an engine is disclosed. The method includes the steps of determining a plurality of parameters, determining a model of the duration of injection of fuel into a cylinder, and determining a wall area of the cylinder that is coated with soot. The method also includes the steps of calculating a value of residual soot in the engine, calculating a value of soot dispersed by dispersants in the engine oil, and determining a model of the soot in the oil as a function of the parameters, the coated wall area, the residual soot, and the dispersed soot.

BEST MODE FOR CARRYING OUT THE INVENTION

The present invention is directed towards a method for determining the condition of oil in an internal combustion engine using a model of the soot that accumulates in the oil to monitor the condition of the oil.

Figure 1:
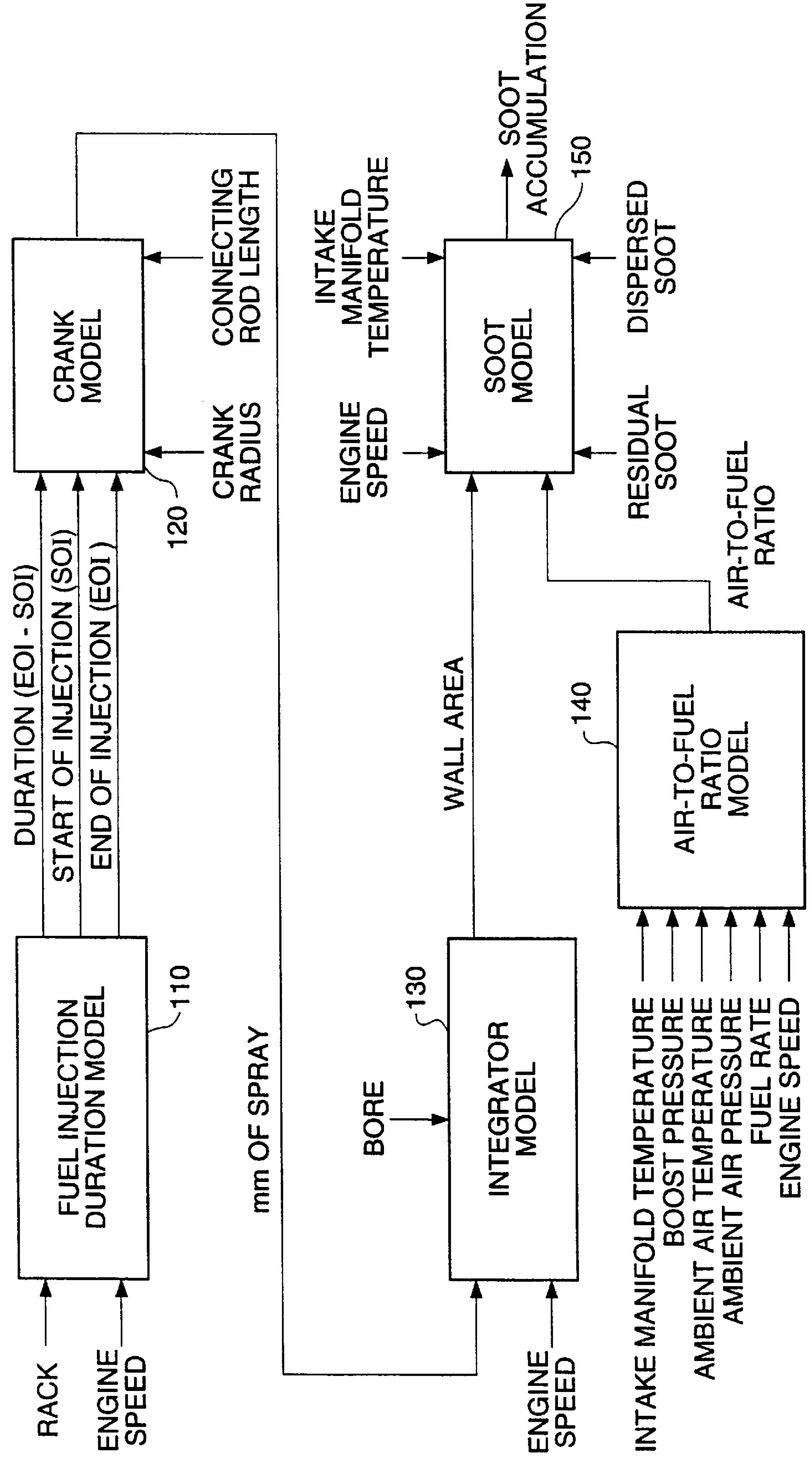
FIG. 1 is a block diagram illustrating an embodiment of the present invention.

With particular reference to FIG. 1, a block diagram of a model 100 to determine soot accumulation is shown. The model 100 includes several specific models, which are described in detail below.

A plurality of parameters are received by the model 100. Parameters may be sensed directly, calculated from other parameters, or determined by other models that are not part of the present invention. Examples of parameters include, but are not limited to: fuel rack position, engine speed, ambient air temperature, ambient air pressure, intake manifold temperature, boost pressure, fuel rate, and air-to-fuel ratio.

A fuel injection duration model 110 receives data defining the fuel rack position and the engine speed, and responsively determines the start of injection (SOI) and the end of injection (EOI). The fuel injection duration model then calculates the duration of fuel injection into the cylinder as the difference in time between the start of injection and the end of injection (EOI-SOI).

Figure 2:
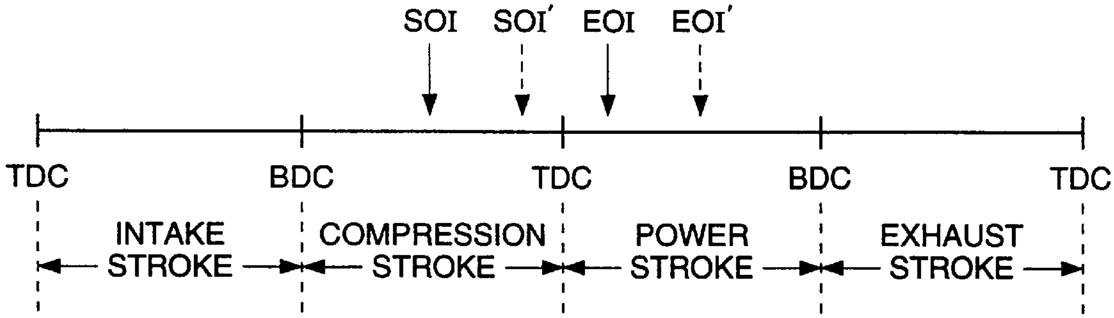
FIG. 2 is a time line illustrating a cycle of operation of an internal combustion engine.

Referring to FIG. 2, a timeline of one complete cycle of an internal combustion engine is shown. The cycle has four stages; an intake stroke, a compression stroke, a power stroke, and an exhaust stroke. During the intake stroke, a piston in the cylinder moves from a position near top dead center (TDC) to near bottom dead center (BDC). During the compression stroke, the piston moves from BDC to TDC. During the power stroke, the piston moves from TDC to BDC. During the exhaust stroke, the piston moves from BDC to TDC.

The timeline of FIG. 2 shows SOI occurring at a time prior to TDC before the power stroke. EOI occurs at a time after TDC during the power stroke. During this time interval, fuel is being injected into the cylinder. As the fuel is injected, the momentum of the fuel spray carries unoxidized fuel in the form of soot to the walls of the cylinder, where the temperature is cooler than in the open chamber of the cylinder. This deposited soot is wiped by piston rings from the walls of the cylinder into the crankcase oil.

An alternate start of injection (SOI') and end of injection (EOI') is shown in FIG. 2 as being delayed in time from the original SOI and EOI. This illustrates a preferred timing method used in engines to meet emissions standards. However, the additional time that the duration of injection exists during the power stroke results in greater exposure of the cylinder walls to fuel spray. This results in greater amounts of soot being created in the cylinder and wiped into the oil, thereby reducing the useful life of the oil.

Figure 3:
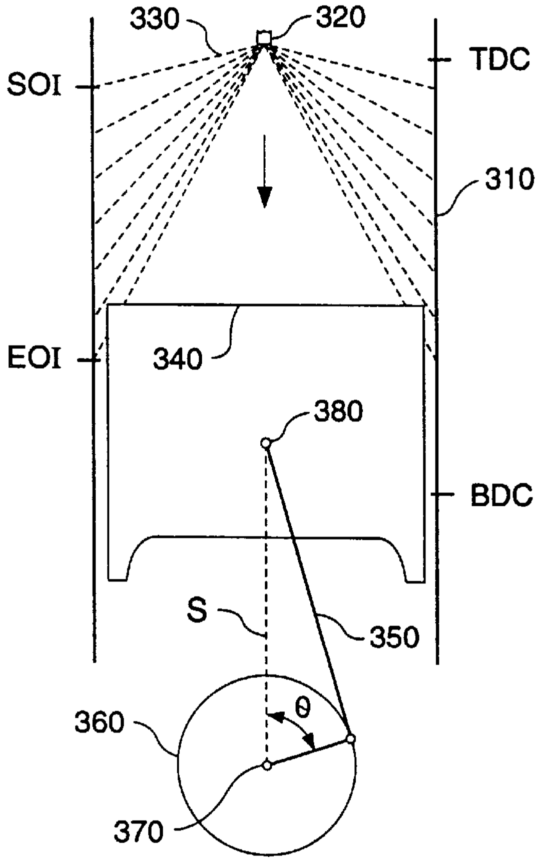
FIG. 3 is a diagrammatic view illustrating fuel being applied to the wall of a cylinder.

The amount of soot deposited in the engine crankcase is proportional to the area of the cylinder wall that is exposed to the fuel spray during injection. Referring to FIGS. 1 and 3, a crank model 120 is shown which provides the information needed to determine the wall area.

In FIG. 3, a piston 340 is shown that reciprocates within a cylinder wall 310. A fuel injector nozzle 320 delivers a fuel spray 330 onto the cylinder wall 310 from SOI to EOI. As the piston 340 moves, the area of the cylinder wall 310 changes in value.

The piston 340 is connected to and driven by a crankshaft 360 via a connecting rod 350. The connecting rod 350 is connected to the piston 340 by a pin at a piston pin axis 380 and is connected to the crankshaft 360 by a pin at the crank axis 370.

The distance (s) from the crank axis to the piston pin axis can be used to determine the height (h) of the cylinder wall 310 that is exposed to the fuel spray 330. The distance (s) is determined by:

$$s = a\cos\theta + \sqrt{(l^2 - a^2\sin^2\theta)} \qquad \text{(Equation 1)}$$

where

α is the radius of the crankshaft 360,

θ is the crank angle, and l is the length of the connecting rod 350.

The wall area (WA) that is effectively coated with soot during injection can be determined as a function of the total area exposed over a period of time by using the following equation:

$$WA_1 = \pi Bh\left(\frac{N}{120}\right)x \qquad \text{(Equation 2)}$$

where

B is the bore (diameter) of the piston 340, h is the height of the exposed cylinder wall 310, N is the engine speed, and x is the length of time that the engine has been running.

In Equation 2, no provision is made for the constant movement of the piston 340 as the fuel spray 330 is injected. A preferred method for determining the effective wall area (WA) is to integrate with respect to either crank angle or time from SOI to EOI. This method is performed in an integrator model 130 shown in FIG. 1. A preferred equation for determining WA is:

$$WA_2 = \int_{SOI}^{EOI} \pi Bh\left(\frac{N}{120}\right)x\,d\theta \qquad \text{(Equation 3)}$$

Alternatively, WA can be determined by:

$$WA_3 = \int_{SOI}^{EOI} \pi Bh\left(\frac{N}{120}\right)x\,dt \qquad \text{(Equation 4)}$$

In Equations 3 and 4, the SOI and EOI are correlated to positions on the cylinder wall 310 as functions of the fuel rack position, the engine speed, and the engine geometry.

An air-to-fuel ratio model 140 shown in FIG. 1 is used to determine the air-to-fuel ratio, which is in turn used to determine the amount of soot in the oil. Parameters that are received by the air-to-fuel model 140 include, but are not limited to: intake manifold temperature, boost pressure, ambient air temperature, ambient air pressure, fuel rate, and engine speed.

A soot model 150 receives the air-to-fuel ratio parameter from the air-to-fuel ratio model 140, and receives the wall area parameter from the integrator model 130. Additionally, the soot model 150 receives such parameters as the engine speed and intake manifold temperature. From these parameters, the soot model 150 determines the amount of soot in the engine oil.

The above description determines the amount of soot in the engine oil during a cycle of the engine. To determine an accumulation of soot in the oil, the total soot is determined by adding the soot per cycle to the previous determination of soot, adding an amount of residual soot in the oil, subtracting any soot absorbed by dispersants in the oil, and subtracting any soot consumed during oil consumption. Oil and soot consumption occurs as small amounts of oil and soot get into the cylinders during combustion, and are burned with the fuel. The concepts of residual soot and soot absorbed by dispersants is discussed below.

In the preferred embodiment, the soot model 150 is a regression-based model. An exemplary equation used to determine soot is:

$$\text{soot}=\alpha_0+\alpha_1x_1+\alpha_2x_2+\alpha_3x_3+\alpha_4x_1x_2+\alpha_5x_1x_3+\alpha_6x_2x_3+\alpha_7x_4\alpha_8x_4^2 \qquad \text{(Equation 5)}$$

where $\alpha_0$–$\alpha_8$ are empirical constants, $x_1$ is engine speed, $x_2$ is the effective wall area, $x_3$ is the intake manifold temperature, and $x_4$ is the air-to-fuel ratio.

In an alternate embodiment, the soot model 150 also includes determinations of residual soot and dispersed soot.

Residual soot is defined as the soot remaining in an engine crankcase after replacing the existing oil with new oil. For example, due to the geometry of the engine, not all oil is removed during an oil change. Therefore, some soot remains and is mixed with the new oil.

Figure 4:
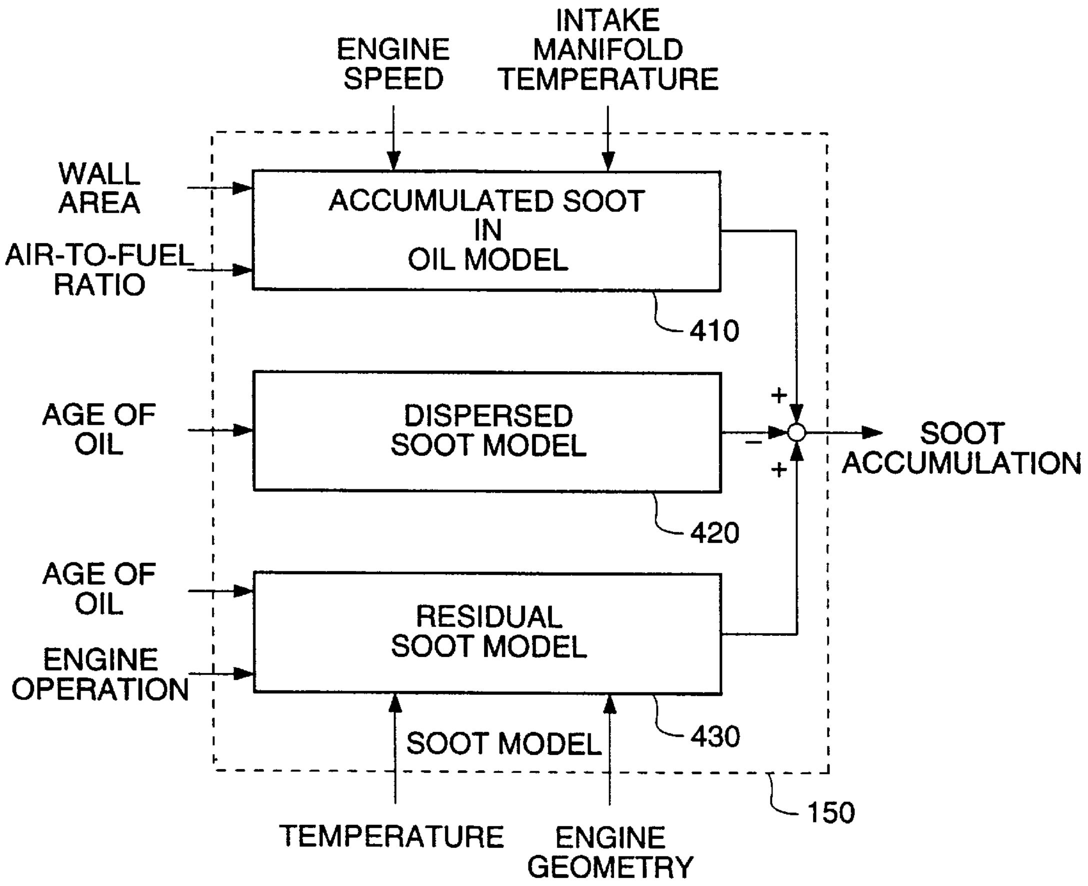
FIG. 4 is a block diagram illustrating a portion of a soot model.

Referring to FIG. 4, a residual soot model 430 is used to receive parameters such as the age of the engine, total number of oil changes, temperature, engine operating parameters, and engine geometry, and responsively determine a value of residual soot. The value of residual soot is added to the soot model 150.

Dispersed soot is defined as the soot that is absorbed by dispersants present in the oil. The particles of soot that are dispersed are not allowed to merge with other soot particles, and thus form pieces of soot large enough to cause damage to the engine. Therefore, dispersed soot does not contribute directly to the end of useful life of the oil.

In FIG. 4, a dispersed soot model 420 monitors the age of the oil and determines a value of dispersed soot. The value of dispersed soot is subtracted from the soot model 150.

Figure 5:
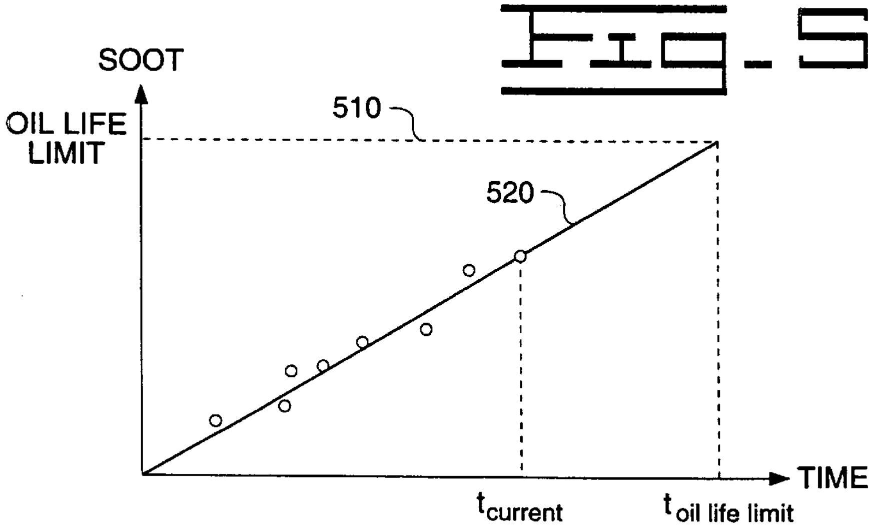
FIG. 5 is a graphical representation of a trend line predicting soot accumulation.

The value of soot determined from the soot model 150 can be plotted over time, as is illustrated in FIG. 5, to predict trends in the oil condition. Using well known curve fitting techniques, a curve of soot over time 520 can be determined. This curve 520 can be extended into the future, and the intersection of the curve 520 with a predetermined oil life limit threshold 510 can be used to predict the end of useful life of the oil. Each data point determined from the soot model 150 increases the accuracy of the curve in predicting the true end of useful life of the oil.

Figure 6:
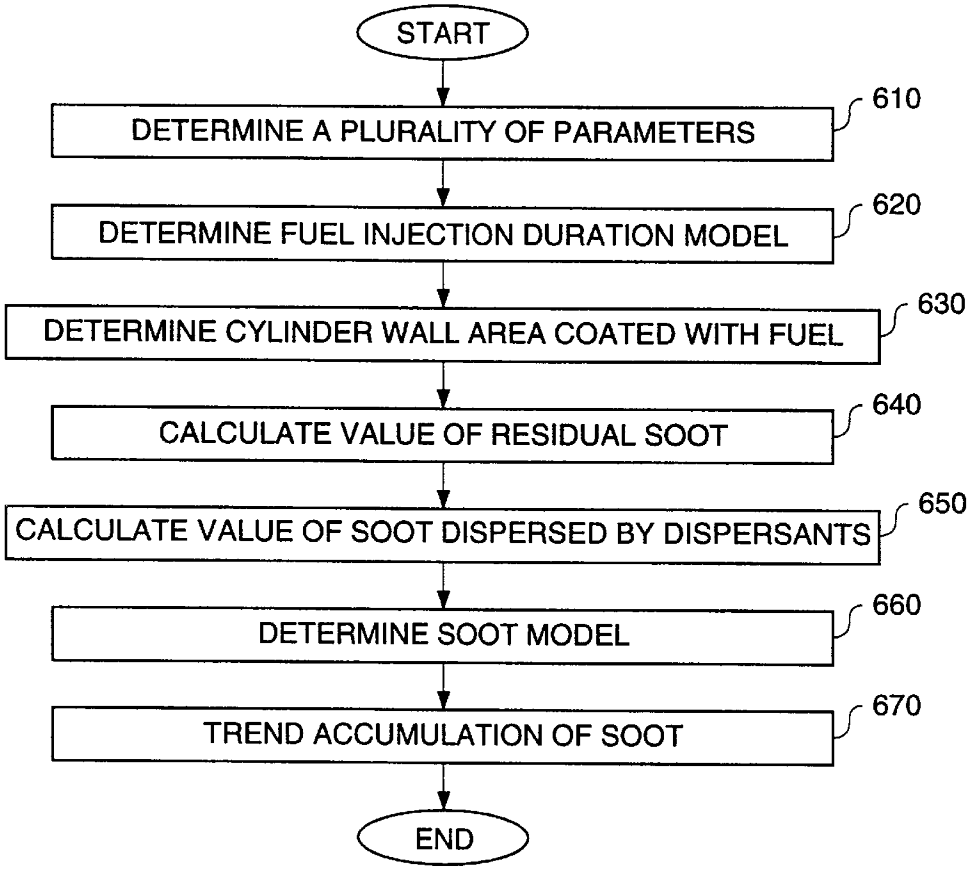
FIG. 6 is a flow diagram of a method of the present invention that estimates an amount of soot in an engine.
Figure 7:
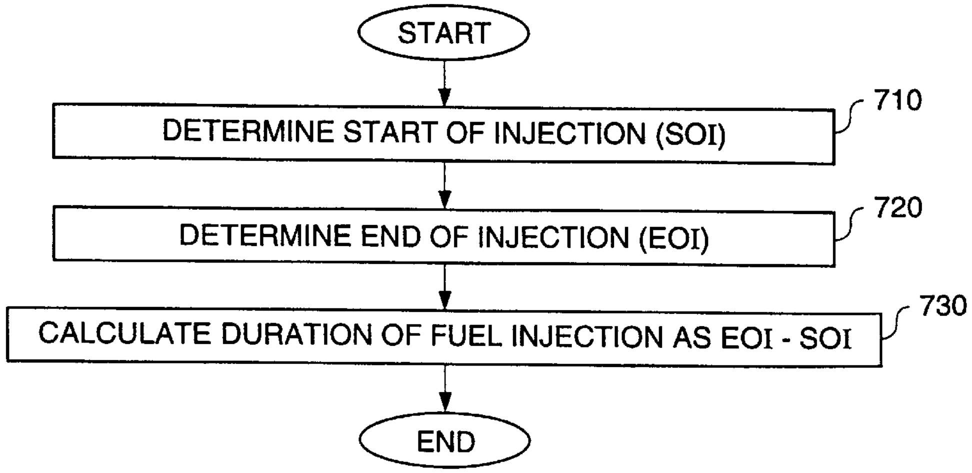
FIG. 7 is a flow diagram of a method of the present invention that determines the duration of fuel injection.

Referring to FIGS. 6 and 7, the operation of the present invention is depicted in flow diagrams.

A plurality of parameters is determined in a first control block 610 in FIG. 6. Examples of parameters include, but are not limited to: fuel rack position, engine speed, ambient air temperature, ambient air pressure, intake manifold temperature, boost pressure, fuel rate, and air-to-fuel ratio.

In a second control block 620, a fuel injection duration model 110 is determined. The fuel injection duration model 110 is further described in the flow diagram of FIG. 7 where, in a first control block 710, the start of injection (SOI) is determined. In a second control block 720, the end of injection (EOI) is determined. In a third control block 730, the duration of fuel injection is calculated as EOI-SOI.

Referring back to FIG. 6, in a third control block 630, the area of the cylinder wall 310 that is coated with soot is determined. The wall area is determined in at least one of the crank model 120 and the integrator model 130, and can be determined by any one of Equations 2, 3, or 4 described above.

In a fourth control block 640, a value of residual soot is calculated. In a fifth control block 650, a value of soot dispersed by dispersants is calculated. The values of residual soot and dispersed soot are delivered to the soot model 150 where, in a sixth control block 660, a value of soot in the oil is determined.

In a seventh control block 670, the end of useful life of the oil is determined by plotting the values of soot determined from the soot model 150 over time, and trending the plot into the future.

Industrial Applicability

As an example of an application of the present invention, several industries operate fleets of machines and vehicles using internal combustion engines as prime movers and power sources. Examples of such fleets are on-highway trucks, off road mining machines, and electric power generators.

A major maintenance cost associated with the operations of these fleets is the periodic replacement of the engine oil. Normally, these oil change intervals are scheduled based on mileage or time of use of the engines. However, scheduling oil changes in this manner does not guarantee that the oil has reached the end of its useful life. Conversely, there is no assurance that the oil has not exceeded its useful life, resulting in some measure of damage to expensive engine components. In both situations, changing engine oil in a large fleet of engines at times other than the end of life of the oil is costly.

The present invention is designed to receive a plurality of parameters associated with the operation of the engine and, through the use of modeling techniques, determine the condition of the engine oil during operation of the engine. The determination of the condition of the oil can then be trended over time to predict when the oil will reach the end of its useful life, thus allowing an operator to determine an optimal and cost-effective time to replace the oil.

In addition, the present invention can be used to initiate an oil condition alert to an operator as the oil nears the end of its useful life. This alert can be on board a machine, or may be sent to a remote location.

Other aspects, objects, and features of the present invention can be obtained from a study of the drawings, the disclosure, and the appended claims.

We claim:

1. A method for determining the condition of lubricating oil in an internal combustion engine, including the steps of:

determining a plurality of parameters associated with the engine;

determining a model of the duration of injection of fuel into a cylinder in the engine;

determining a wall area of the cylinder that is coated with soot during injection;

determining a model of the soot in the oil as a function of the parameters, the fuel injection duration model, and the coated wall area; and responsively determining the condition of the oil.

2. A method, as set forth in claim 1, wherein the wall area is determined as a function of the distance from a longitudinal axis through the center of a crankshaft to an axis through a piston pin.

3. A method, as set forth in claim 2, wherein the wall area is determined as a function of the dimensions of the coated wall of the cylinder and the engine speed.

4. A method, as set forth in claim 3, wherein the wall area is determined as a function of an integral of the coated wall area with respect to the change in angular position of the crankshaft during the injection of fuel.

5. A method, as set forth in claim 3, wherein the wall area is determined as a function of an integral of the coated wall area with respect to time during the injection of fuel.

6. A method, as set forth in claim 1, including the step of calculating a value of residual soot in the engine as a function of the engine geometry and at least one occurrence of replacing used engine oil with new engine oil.

7. A method, as set forth in claim 1, including the step of calculating a value of soot dispersed by dispersants in the engine oil as a function of at least one occurrence of replacing used engine oil with new engine oil.

8. A method, as set forth in claim 1, including the steps of:

calculating a value of residual soot in the engine as a function of the engine geometry and at least one occurrence of replacing used engine oil with new engine oil; and calculating a value of soot dispersed by dispersants in the engine oil as a function of at least one occurrence of replacing used engine oil with new engine oil.

9. A method, as set forth in claim 8, wherein determining a model of the soot includes the step of determining the model as a function of the parameters, the fuel injection duration model, the coated wall area, the value of residual soot, and the value of the soot dispersed.

10. A method, as set forth in claim 1, wherein the model of the duration of injection of fuel is determined as a function of the fuel rack position and the engine speed.

11. A method, as set forth in claim 10, wherein determining the model of the duration of injection of fuel includes the steps of:

determining the start of injection (SOI);

determining the end of injection (EOI); and calculating the duration of injection as the time interval from the start of injection to the end of injection (EOI-SOI).

12. A method, as set forth in claim 1, wherein a parameter is fuel rack position.

13. A method, as set forth in claim 1, wherein a parameter is engine speed.

14. A method, as set forth in claim 1, wherein a parameter is ambient air temperature.

15. A method, as set forth in claim 1, wherein a parameter is ambient air pressure.

16. A method, as set forth in claim 1, wherein a parameter is intake manifold temperature.

17. A method, as set forth in claim 1, wherein a parameter is boost pressure.

18. A method, as set forth in claim 1, wherein a parameter is fuel rate.

19. A method, as set forth in claim 1, wherein a parameter is air-to-fuel ratio.

20. A method, as set forth in claim 1, further including the step of trending an accumulation of soot determined from the soot model to predict an end of useful life of the oil.

21. A method, as set forth in claim 20, further including the step of initiating an alert as the oil nears the end of its useful life.

22. A method, as set forth in claim 21, wherein the alert is delivered to an operator on board a machine driven by the engine.

23. A method, as set forth in claim 21, wherein the alert is delivered to a remote location.

24. A method for determining the condition of oil in an internal combustion engine, including the steps of:

determining a plurality of parameters associated with the engine;

determining a model of the duration of injection of fuel into a cylinder in the engine;

determining a wall area of the cylinder that is coated with soot during injection;

calculating a value of residual soot in the engine as a function of the engine geometry and at least one occurrence of replacing the used engine oil with new engine oil;

calculating a value of soot dispersed by dispersants in the engine oil as a function of at least one occurrence of replacing the used engine oil with new engine oil;

determining a model of the soot in the oil as a function of the parameters, the coated wall area, the residual soot, and the dispersed soot; and responsively determining the condition of the oil.

25. A model for determining the condition of oil in an internal combustion engine, comprising:

a fuel injection duration model for determining a start of injection, an end of injection, and a duration of injection of fuel into a cylinder in the engine;

a crank model for receiving the determined data from the fuel injection duration model, and responsively determining the area exposed to injection of fuel in an inner wall of the cylinder; and a soot model for receiving the determined data from the crank model and for receiving a plurality of parameters associated with the engine, responsively determining a value of soot in the oil, and responsively determining the condition of the oil.

26. A model, as set forth in claim 25, further comprising an integrator model for receiving data from the crank model, and responsively determining the area exposed to injection of fuel in the inner wall of the cylinder as a function of an integral of the wall area with respect to at least one of the angular rotation of a crankshaft in the engine and the time duration of fuel injection.

27. A model, as set forth in claim 25, further comprising an air-to-fuel ratio model for receiving a plurality of parameters, and responsively determining an air-to-fuel ratio, the air-to-fuel ratio data being delivered to the soot model for determination of the value of soot in the oil.

28. A model, as set forth in claim 27, wherein the plurality of parameters includes an intake manifold temperature, a boost pressure, an ambient air temperature, an ambient air pressure, a fuel rate, and an engine speed.

29. A model, as set forth in claim 25, further comprising a residual soot model for determining a value of residual soot as a function of the geometry of the engine, and delivering the value of residual soot to the soot model.

30. A model, as set forth in claim 25, further comprising a dispersed soot model for determining a value of soot dispersed by dispersants in the oil, and delivering the value of dispersed soot to the soot model.

* * * * *